A. S. VOSE.
ROTARY CUTTER.
No. 11,526. Reissued Mar. 24, 1896.
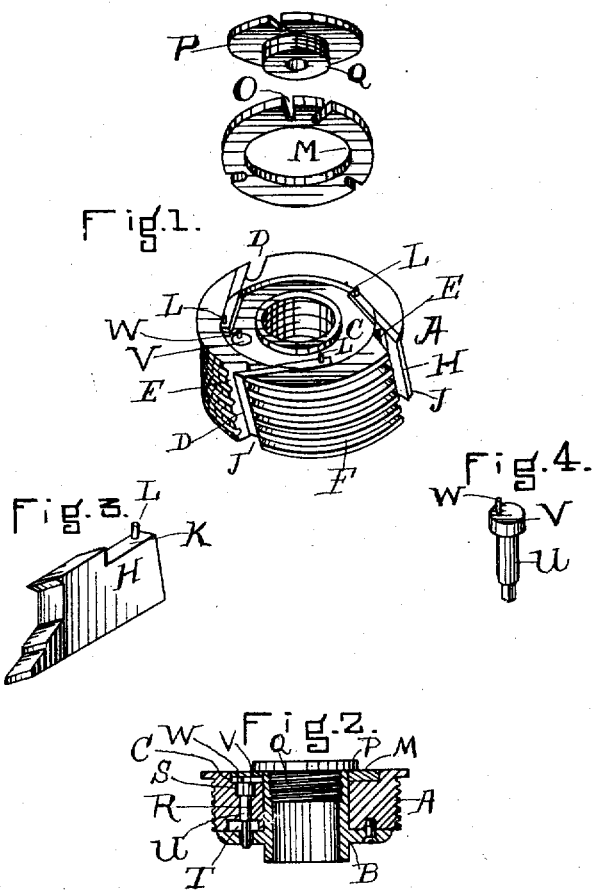
WITNESSES.
Matthew M. Blunt.
J. Murphy.
INVENTOR.
Ambrose S. Vose
by Jas. H. Churchill
ATT'Y.
ANDREW B. GRAHAM, PHOTO-LITHO. WASHINGTON, D.C.

UNITED STATES PATENT OFFICE.

AMBROSE S. VOSE, OF BOSTON, MASSACHUSETTS, ASSIGNOR TO THE VOSE EDGE FINISHING COMPANY, OF NASHUA, NEW HAMPSHIRE.

ROTARY CUTTER.

SPECIFICATION forming part of Reissued Letters Patent No. 11,526, dated March 24, 1896.

Original No. 493,144, dated May 23, 1893. Application for reissue filed September 13, 1895. Serial No. 562,470.

*To all whom it may concern:*

Be it known that I, AMBROSE S. VOSE, a citizen of the United States, residing at Boston, in the county of Suffolk and State of Massachusetts, have invented an Improvement in Rotary Cutters, of which the following description, in connection with the accompanying drawings, is a specification, like letters of the drawings referring to like parts.

My invention relates to improvements in devices for trimming the heels or soles of boots and shoes, of that class or description comprising a rotatable wheel and a series of adjustable knives, which are capable of being moved in and out to regulate the depth of cut, (and substantially such as shown and described in United States Patent No. 457,386, granted to me August 11, 1891.) In the patent referred to the knives are adjusted by means of a rotatable ring or band, and the said knives are held or locked in their adjusted position by means of a flange on a threaded boss, which flange normally clamps the said ring and holds it from turning.

When it is desired to adjust the knives in the cutter shown in the patent referred to, the threaded boss is unscrewed sufficiently to release the actuating-ring and permit it to be turned by the hand of the operator, and when the knives have been placed in their desired or adjusted position, the actuating-ring is again rendered fixed or stationary by setting up the threaded boss until its flange is firmly engaged with the actuating-ring.

The construction of rotary trimmer shown in the patent referred to is faulty, in that it is substantially impossible to obtain by a hand-turning of the actuating-ring a fine adjustment of the knives—that is, such an adjustment as is practically termed a "hair-adjustment"—and the said rotary trimmer is further defective or faulty on account of the liability of moving the band or ring from its adjusted position by the flange on the boss, when the said boss is set up to firmly hold or engage the said band, and furthermore, the engagement of the knives with the work is liable to overcome the frictional hold of the flange on the band or ring, and thereby displace the knives from their adjusted or cutting position.

It is the object of this invention to provide a rotary trimmer of the class shown in the patent referred to, in which the defects or faults above referred to may be overcome, and a more perfect rotary cutter or trimmer obtained, and I accomplish this result by providing the rotary trimmer with an eccentric connection between the rotatable band or ring, and a rotatable actuating shaft or pin, so that rotation or partial rotation of the said shaft or pin produces a like movement of the band or ring, and a longitudinal movement of the knives. The eccentric connection between the actuating-shaft and the band or ring also constitutes a lock for the knives in their adjusted positions, and permits the said band or ring to be loose or unclamped by the threaded boss, and free to respond to the movement of the actuating-shaft, and also prevents the knives or cutters being moved from their adjusted position by their engagement with the work.

In the accompanying drawings, Figure 1 is a perspective view of a trimmer embodying my invention, the parts being separated to more clearly illustrate their construction and relation. Fig. 2 is a sectional view of the same, the parts being in position. Fig. 3 is a perspective view of one of the knives or cutters. Fig. 4 is a perspective view of the pin for turning the annular band or ring to adjust the cutters.

In the said drawings, the reference-letter A designates the wheel of the trimmer provided with the hub B, the annular groove or channel C, and the series of inclined throats D, having the recesses E at the mouths thereof. The wheel is provided with a series of peripheral channels F, as is usual in devices of this character. In the inclined throats D are located the knives, blades or cutters H, having the cutting-edges J, and at one side cut out at K and provided with studs, pins or projections L. In the annular groove or channel of the wheel is located the annular ring or band M, having a series of kerfs or recesses in the outer edge thereof to receive the pins or projections L of the cutters H, and is also provided on its inner face with a slot O.

The letter Q designates a screw-threaded boss having a central aperture for the passage of a driving-rod or shaft. This hub is provided with an annular flange P of a greater diameter than the hub, so that when in place it will project beyond the edges thereof and overlap the plate M, so as to retain it in the groove C.

The parts thus far described are and may be the same as shown and described in my patent above referred to.

In accordance with this invention the ring or band M is eccentrically connected to an actuating shaft or pin U, (herein shown as passed through a transverse aperture R in the wheel A,) having each end countersunk or enlarged, as herein represented and as seen at S and T, the said pin being provided with a head V, which is flush with the back wall of the groove or channel C. The opposite end of this pin is made angular to receive a wrench or key for the purpose of turning the same. The head V is provided with an eccentrically-placed stud or projection W, which engages with the slot O in the ring or band M.

The operation will be readily understood. When it is desired to adjust the knives or cutters so as to regulate the depth of the cut thereof, the pin U is turned by a wrench or key, and by means of the eccentric stud W carried thereby engaging with the slot O in the ring or band M the latter will be correspondingly turned, and by reason of the kerfs or recesses therein engaging with the studs or projections L of the knives or cutters H said knives will be forced in or out and be made to project more or less beyond their seats in the wheel A, according to the direction in which the pin is turned.

By means of the eccentric connection between the rotatable pin U and the ring or band M, I am enabled to adjust the knives much finer than is possible by rotating the said ring or band by hand, and as a result a more perfect working tool is obtained, and consequently a more finished trimming of the heel or sole is effected. Furthermore, it will be seen that the eccentric acts as a lock for the knives and avoids all danger of the ring being turned backward by the engagement of a knife or knives with the work, as is liable when the friction between the flange P of the screw-threaded boss is alone depended upon to hold the knives in their adjusted position, as is the case in the rotary trimmer shown and described in my patent above referred to; for it will be seen that force applied to the edge of a knife will be transmitted to the actuating-shaft on a radial line through the eccentric-pin, and therefore rotation of the shaft cannot be produced in this manner, and consequently the knives cannot be moved from their adjusted position by their engagement with the work.

By means of the eccentric connection between the ring or band M and the actuating pin or shaft the flange P merely serves to retain the said ring or band on the wheel and prevent its falling off, so that the said band or ring is free at all times to respond to movement of the rotatable pin or shaft U.

I claim—

1. In a rotary trimmer, the combination with a wheel provided with a plurality of knives or cutters, and a rotatable band or ring connected to said knives to effect simultaneous movement or adjustment of the said knives, of a rotatable pin or shaft eccentrically connected to said rotatable ring or band to produce rotary movement of the said ring or band and thereby adjustment of the said knives and to lock the said knives and their actuating band or ring until moved by rotation of the said shaft or pin, substantially as and for the purpose specified.

2. In a rotary trimmer, the combination with a wheel provided with a plurality of knives or cutters, and a rotatable band or ring connected to said knives to effect simultaneous movement or adjustment of the said knives, of a rotatable pin or shaft provided with a head and an eccentric-pin engaging the said ring or band to produce rotation of the said ring or band and simultaneous adjustment of the said knives by rotary movement of the said pin or shaft, and to lock the said knives against movement until actuated by the said pin or shaft, substantially as described.

3. In a rotary trimmer, the combination with a wheel provided with inclined throats, knives or cutters movable in said inclined throats, a ring or band, and devices connecting the said knives or cutters to said ring or band, of a pin or shaft carried by the wheel, and an eccentric connection between the said pin or shaft and the said ring or band, for the purpose specified.

4. In a rotary trimmer, the combination with the wheel having an interiorly-screw-threaded hub, inclined throats, peripheral channels, and annular groove upon one of its faces and a transverse aperture, enlarged at each end, of the annular band or ring, located in said groove, having a slot in its inner face and a series of peripheral kerfs or recesses, the screw-threaded boss having an annular flange projecting beyond the edges of the hub and overlapping the said band or ring, the pin seated in the transverse aperture in the wheel, provided with a head and an eccentric-pin, and the knives or cutters provided with pins or projections engaging with the kerfs or recesses in the annular band, substantially as described.

AMBROSE S. VOSE.

Witnesses:
JAS. H. CHURCHILL,
J. MURPHY.